(12) United States Patent
Zhu

(10) Patent No.: US 12,481,425 B2
(45) Date of Patent: Nov. 25, 2025

(54) DETERMINING REFERENCE VOLTAGE OFFSETS FOR READ OPERATIONS IN A MEMORY SYSTEM

(71) Applicant: Micron Technology, Inc., Boise, ID (US)

(72) Inventor: Jianying Zhu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 18/429,139

(22) Filed: Jan. 31, 2024

(65) Prior Publication Data

US 2024/0272798 A1 Aug. 15, 2024

Related U.S. Application Data

(60) Provisional application No. 63/484,732, filed on Feb. 13, 2023.

(51) Int. Cl.
*G06F 3/00* (2006.01)
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC .............. G06F 3/0679; G06F 11/0727; G06F 11/0751; G06F 11/0793; G06F 11/1048; G06F 11/1068; G06F 12/0238; G06F 12/10; G06F 12/1408; G06F 2212/7201; G06F 3/0604; G06F 3/0613; G06F 3/0655; G06F 3/0659; G06F 11/1072
USPC ......... 365/145, 158, 185.15, 185.28, 185.29, 365/200
See application file for complete search history.

(56) References Cited

U.S. PATENT DOCUMENTS 10,175,892 B1 * 1/2019 Kim ...................... G06F 3/0653

\* cited by examiner

*Primary Examiner* — Thong Q Le
(74) *Attorney, Agent, or Firm* — Holland & Hart LLP

(57) ABSTRACT

Methods, systems, and devices for determining reference voltage offsets for read operations in a memory system are described. A memory system may read a memory page using a first reference voltage that is based on a first offset value and using a second reference voltage that is based on a second offset value. The memory system may determine, based on reading the page using the first reference voltage, a first quantity of memory cells with threshold voltages above the first reference voltage. The memory system may determine, based on reading the page using the second reference voltage, a second quantity of memory cells with threshold voltages above the second reference voltage. The memory system may select, based on the first quantity, the second quantity, and a target quantity, an offset value for a set of pages that that is between the first offset value and the second offset value.

20 Claims, 6 Drawing Sheets

DETERMINING REFERENCE VOLTAGE OFFSETS FOR READ OPERATIONS IN A MEMORY SYSTEM

CROSS REFERENCE

The present Application for Patent claims the benefit of U.S. Provisional Patent Application No. 63/484,732 by ZHU et al., entitled "DETERMINING REFERENCE VOLTAGE OFFSETS FOR READ OPERATIONS IN A MEMORY SYSTEM," filed Feb. 13, 2023, assigned to the assignee hereof, and expressly incorporated by reference in its entirety herein.

TECHNICAL FIELD

The following relates to one or more systems for memory, including determining reference voltage offsets for read operations in a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not—or (NOR) and not—and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states if disconnected from an external power source.

DETAILED DESCRIPTION

Figure 1:
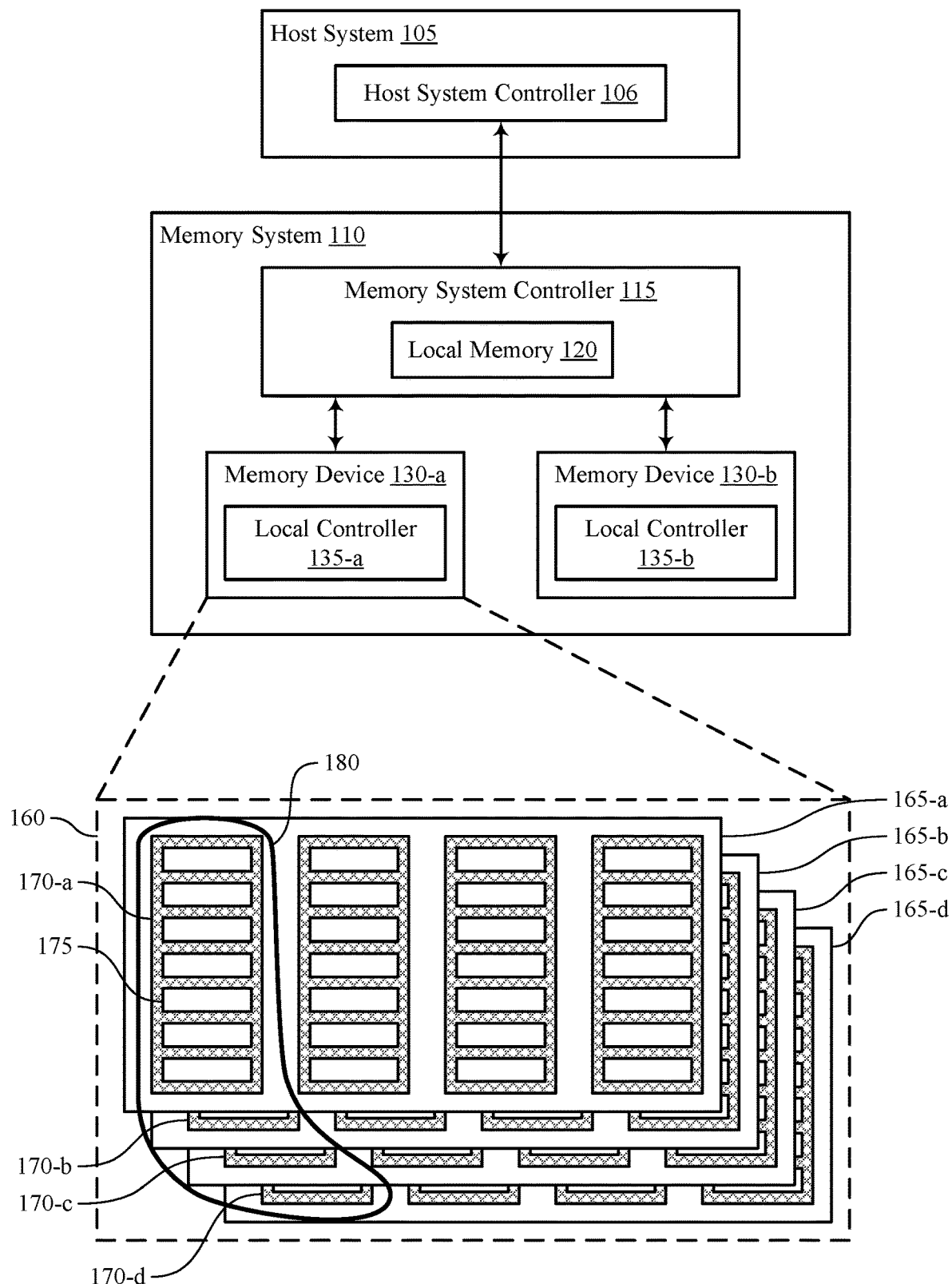
FIG. 1 illustrates an example of a system that supports determining reference voltage offsets for read operations in accordance with examples as disclosed herein.

A memory system may use respective threshold voltages of memory cells to store information. For example, the memory system may, via a write operation, set the threshold voltages of memory cells to a set of target levels each of which represents a different logic values. However, after writing and over time, the threshold voltages stored by memory cells may drift (e.g., decrease), a phenomenon that may be referred to as slow charge loss (SCL) or threshold voltage (Vt) drift. To compensate for Vt drift, a memory system may modify (e.g., reduce) the reference voltages used to read the memory cells by respective offset values that are based on the amount of Vt drift. But existing techniques for determining the Vt drift for memory cells (referred to generally as Vt drift detection procedures) may have long latencies, which may impair the performance of the memory system and/or limit when the Vt drift detection procedures can be performed, among other disadvantages.

According to the techniques described herein, a memory system may improve performance by performing a Vt drift detection procedure that has reduced latency relative to other techniques. As part of the Vt drift detection procedure, the memory system may iteratively read a set of memory cells (e.g., one or more pages) using different reference voltages. The reference voltages may be based on different offset values which are associated with different ranges of Vt drift. For each read operation, the memory system may compare the quantity of memory cells with Vt levels above the reference voltage used for that read operation to a target quantity (e.g., 50%×3σ). If the quantity of memory cells with Vt levels above the reference voltage switches between read operations from being less than the target quantity to being greater than the target quantity (or vice versa) the memory system may determine that the Vt drift is between the Vt drift ranges associated with the offset values used for the reference voltages. Accordingly, the memory system may select an offset value for the set of memory cells that is based on (e.g., between) the offset values used for those reference voltages.

In addition to applicability in memory systems as described herein, techniques for improved reference voltage offsets for read operations in a memory system may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating improved reference voltage offsets for read operations in a memory system, which may decrease processing or latency times, improve response times, or otherwise improve system performance, among other benefits.

Figure 2:
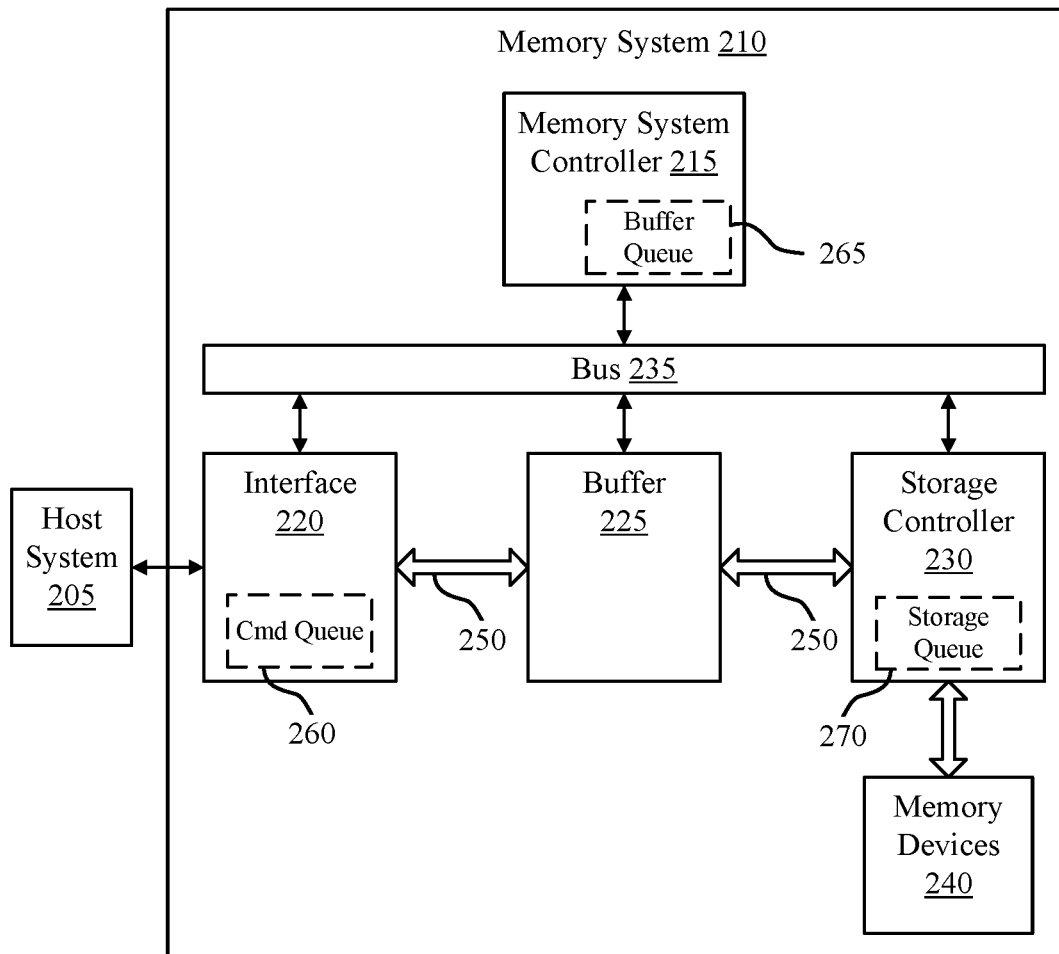
FIG. 2 illustrates an example of a system that supports determining reference voltage offsets for read operations in accordance with examples as disclosed herein.

Features of the disclosure are initially described in the context of systems, devices, and circuits with reference to FIGS. 1 through 2. Features of the disclosure are described in the context of threshold voltage distributions and a process flow with reference to FIGS. 3 through 4. These and other features of the disclosure are further illustrated by and described in the context of an apparatus diagram and flowchart that relate to determining reference voltage offsets for read operations in a memory system with reference to FIGS. 5 through 6.

FIG. 1 illustrates an example of a system 100 that supports determining reference voltage offsets for read operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with one or more host system controllers 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), one or more memory controllers (e.g., NVDIMM controller), and one or more storage protocol controllers (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between one or more host system controllers 106 of the host system 105 and one or more memory system controllers 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support determining reference voltage offsets for read operations in a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

To write a logic value (e.g., a single-bit value or a multi-bit value) to a memory cell, the memory system 110 may bias the access lines of the memory cell so that the threshold voltage of the memory cell is set to a target voltage level corresponding to that logic value. To read the logic value of a memory cell, the memory system 110 may compare the threshold voltage of the memory cell with one or more reference voltages associated with the different logic values supported by the memory system 110.

Across a set of memory cells, the threshold voltage of memory cells written with the same logic value may vary, resulting in a distribution of threshold voltages (referred to as a Vt distribution) that are clustered around the target voltage level for that logic value. The memory cells may also suffer from Vt drift (also referred to as slow charge loss) or some other phenomenon that causes the threshold voltages to shift downward (e.g., decrease). Sufficiently large changes in threshold voltages may prevent the memory system 110 from reliably reading the memory cells, so the memory system 110 may update the reference voltages used to read the memory cells to compensate for Vt drift. For example, the memory system 110 may reduce the reference voltages used for reading the memory cells to compensate for the lower threshold voltages of the memory cells caused by Vt drift. But existing techniques for determining the Vt drift (which is the basis for the offset values used to reduce the reference voltages) may have high latency, which may impair the performance of the memory system 110.

According to the present disclosure, the memory system 110 may improve performance by performing a Vt drift detection procedure that has lower latency relative to other Vt drift detection procedures.

In one example, the memory system 110 may determine the Vt drift associated with a Vt distribution (e.g., the highest Vt distribution) by reading memory cells using different reference voltages that are based on different offset values (which in turn may be associated with different Vt drifts). For each reference voltage, the memory system 110 may compare the quantity of memory cells with Vt levels above that reference voltage to a target quantity. If the quantity of memory cells with Vt levels above the reference voltage switches between read operations from being less than the target quantity to being greater than the target quantity (or vice versa) the memory system 110 may determine that the Vt drift is between the Vt drifts associated with the offset values. Accordingly, the memory system 110 may select an offset value for the Vt distribution that is based on the determined Vt drift. Offset voltages for other Vt distributions may also be selected based on the determined Vt drift.

In an alternative, the memory system 110 may determine whether the quantity of memory cells with Vt levels above the reference voltage falls within a threshold range of the target quantity. If the quantity of memory cells with Vt levels above the reference voltage falls within the threshold range of the target quantity, the memory system 110 may determine that the Vt drift for the set of memory cells is the Vt drift associated with the offset value and may select an offset value for the Vt distribution that is based on the offset value used for the reference voltage.

FIG. 2 illustrates an example of a system 200 that supports determining reference voltage offsets for read operations in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

As noted, the memory system 210 may store different logic values in the memory cells by setting the threshold voltages of the memory cells to different target Vt levels associated with the logic values. To read the logic values, the memory system 210 may use reference voltages that are between the target Vt levels. For example, referring to Table 1, the memory system 210 may write different multi-bit values (e.g., for TLCs) by setting the threshold voltages of the memory cells to different target Vt levels and may read the logic values store by the memory cells by comparing the threshold voltages of the memory cells with reference voltages L1 through L7.

TABLE 1

Bin offset values for TLC reference voltages

| Reference voltage | Bin 0 offset value | Bin 1 offset value | Bin 2 offset value | Bin 3 offset value | Bin 4 offset value | Bin 5 offset value | Bin 6 offset value | Bin 7 offset value |
| --- | --- | --- | --- | --- | --- | --- | --- | --- |
| L1 | L1_0 | L1_1 | L1_2 | L1_3 | L1_4 | L1_5 | L1_6 | L1_7 |
| L2 | L2_0 | L2_1 | L2_2 | L2_3 | L2_4 | L2_5 | L2_6 | L2_7 |
| L3 | L3_0 | L3_1 | L3_2 | L3_3 | L3_4 | L3_5 | L3_6 | L3_7 |
| L4 | L4_0 | L4_1 | L4_2 | L4_3 | L4_4 | L4_5 | L4_6 | L4_7 |
| L5 | L5_0 | L5_1 | L5_2 | L5_3 | L5_4 | L5_5 | L5_6 | L5_7 |
| L6 | L6_0 | L6_1 | L6_2 | L6_3 | L6_4 | L6_5 | L6_6 | L6_7 |
| L7 | L7_0 | L7_1 | L7_2 | L7_3 | L7_4 | L7_5 | L7_6 | L7_7 |

Each reference voltage may have a corresponding set of offset values (denoted Ln_0 through Ln_7 for reference voltage n) for adjusting the reference voltage so that the memory system 210 can compensate for Vt drift. So, the set of offset values for a reference voltage may include an offset value for different amounts or ranges of Vt drift, which may also be referred to as "bins," (e.g., bin 0 through bin 7). So, the offset values for bin 0 may refer to the offset values for an amount or range of Vt drift. The offset values for a bin (e.g., VT drift) may vary across reference voltages because higher threshold voltages may be associated with more severe Vt drift.

To determine the bin (Vt drift) for a set of memory cells (so that the memory system 210 can select the appropriate offset values for the reference voltages), the memory system 210 may use the Vt drift detection techniques described herein.

Specifically, the memory system 210 may use the Vt drift detection techniques to determine the Vt drift (e.g., bin) associated with the highest Vt target voltage (which may suffer more from Vt drift relative to lower Vt target voltages). Determining the worse-case Vt drift (e.g., bin) may prevent the memory system 210 from under-compensating for the different Vt drifts across the various logic values. Upon determining the Vt drift (e.g., bin), the memory system 210 may select the offset values corresponding to that Vt drift (e.g., bin). For example, if the memory system 210 determines that the Vt drift for the set of memory cells falls within bin 3, the memory system 210 may select for use the offset values corresponding to bin 3 (e.g., L0_3 through L7_3).

Figure 3:
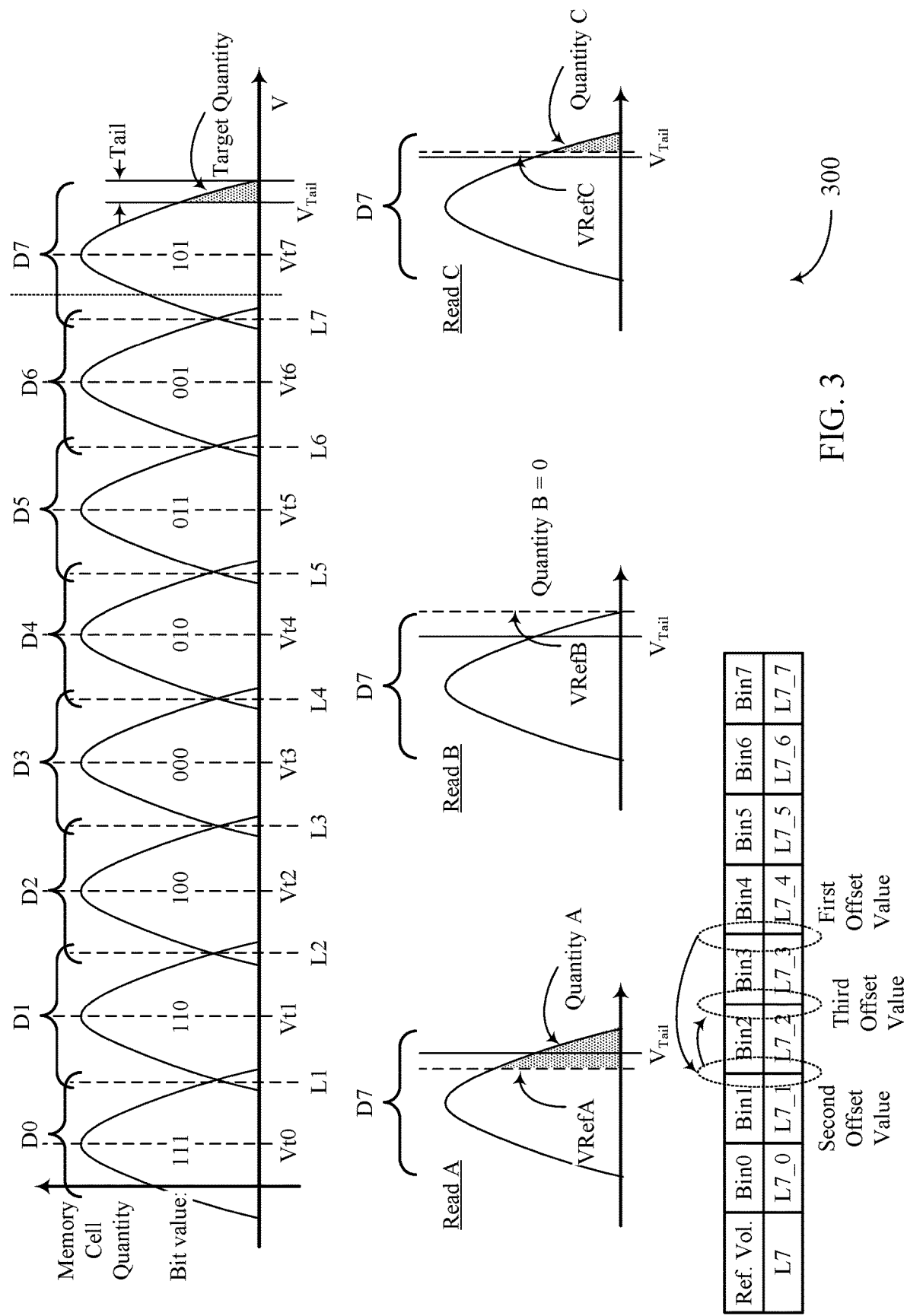
FIG. 3 illustrates an example of threshold voltage distributions that support determining reference voltage offsets for read operations in a memory system in accordance with examples as disclosed herein.

FIG. 3 illustrates an example of Vt distributions 300 that support determining reference voltage offsets for read operations in accordance with examples as disclosed herein. The Vt distributions 300 may be examples of Vt distributions for TLCs, where a TLC refers to a memory cell that is configured to store three bits using one of eight target Vt levels supported by the memory system. So, the Vt distributions 300 may include eight Vt distributions for eight target Vt levels (labeled Vt0 through Vt7), each target Vt value of which may represent or be associated with a respective multi-bit value. For example, Vt0 may represent logic value 111, Vt1 may represent logic value 110, and so on and so forth as illustrated in FIG. 2. The Vt distribution for a target Vt level may be generally centered around the target Vt level and may indicate the quantities of memory cells with various Vt levels.

Although described with reference to TLCs, the techniques described herein can be implemented using any type of threshold-voltage based memory cell, including single-level cells (SLCs) that are configured to store a single bit using two threshold voltage levels, bi-level cells (BLCs) that are configured to store two bits using four threshold voltages, and qual-level cells (QLCs) that are configured to store four bits using sixteen threshold voltage levels. In general, a memory cell may store n bits using 2n threshold voltage levels. In a TLC scenario, L1 and L5 may be associated with lower page data (e.g., the least significant bits of the memory cells), L2, L4, and L6 may be associated with upper page data (e.g., the intermediate bits of the memory cells), and L3 and L7 may be associated with extra page data (e.g., the most significant bits of the memory cells).

To differentiate between logic values during a read operation, a memory system may use reference voltages (labeled L1 through L7) that are more or less centered between adjacent target Vt levels. For example, the reference voltage for differentiating between logic value 111 and logic value 011 (e.g., L1) may be equidistant from, or otherwise positioned between, the target Vt levels for logic value 111 (e.g., Vt0) and logic value 011 (e.g., Vt1). The memory system may compare the Vt level of a memory cell with one or more reference voltages and determine the logic value of the memory cell based on the comparison. For example, if the Vt level of a memory cell is less than L1, the memory system may determine that the memory cell stores logic value 111.

Initially (e.g., at a time t0 after writing the memory cells), the Vt distributions 300 may appear as shown in FIG. 3. However, over time (e.g., at a time t1 after writing the memory cells) the Vt distributions 300 may shift left due to Vt drift (also referred to as slow charge loss). Accordingly, the reference values used to read the memory cells may become inaccurate, which may reduce the ability of the memory system to reliably distinguish between logic values during read operations (resulting in read errors). The amount of Vt drift experienced by a memory cell may vary with the target Vt level (with higher target Vt levels experiencing more Vt drift). To compensate for Vt drift, the memory system may modify the reference voltages by offset values (e.g., as discussed with reference to Table 1) that are based on the amount of Vt drift. For example, the memory system may reduce L1 through L7 by respective offset values for the bin (Vt drift) determined by the memory system.

But existing techniques for determining the bin (e.g., associated with the Vt drift) for a set of memory cells may be time-consuming. For example, existing techniques may require up to eight trial read operations (e.g., one for each bin) and may be limited to single-plane reads. Such techniques may take long enough that the memory system is prevented from using the techniques during latency-sensitive stages of operation (e.g., during an initialization stage that occurs after power-up). Until the memory system has time to perform bin detection, the memory system may be relegated to using inaccurate offset values, which may impair the reliability of the memory system. Additionally, the excessive latency of existing bin detection techniques may negatively impact user experience by increasing the overall latency of the memory system during performance of the bin detection techniques. Existing bin detection techniques that rely on single-plane reads may also be susceptible to errors resulting from outlier memory pages (e.g., pages with Vt levels that are not representative of most pages).

By implementing the bin detection technique described herein, a memory system may improve the latency and accuracy of bin detection, which in turn may allow the memory system to select appropriate offset values for the reference voltages used to read the memory cells.

The memory system may detect the bin for a set of memory cells by A) iteratively reading the set of memory cells with different reference voltages that are based on different offset values (which in turn are associated with different Vt drifts) and B) determining the quantity of memory cells with Vt levels above the reference voltages to determine the tail reference voltage ($V_{Tail}$) that defines the tail of Vt distribution D7 (where the tail refers to the x (e.g., 50%×30) highest Vt level memory cells). Determining the tail reference voltage ($V_{Tail}$) may allow the memory system to determine how far left Vt distribution D7 has shifted left since writing, which is indicative of the Vt drift.

As an illustration, the memory system may read (as part of Read A) a set of memory cells using a first reference voltage (VRefA) that is based on a first offset value. In some examples (e.g., in a binary search), the first offset value may be in between the offset values for bin 3 and bin 4. The first reference voltage (VRefA) may be a baseline reference voltage that is reduced by the first offset value (e.g., VRefA=baseline reference voltage−first offset value). After reading the set of memory cells using the first reference voltage (VRefA), the memory system may determine the quantity of memory cells with Vt levels above the first reference voltage (VRefA). The quantity of memory cells with Vt levels above the first reference voltage, as determined during Read A, may be denoted Quantity A. The memory system may compare Quantity A with a target quantity (e.g., 50%×30) associated with the tail of Vt distribution D2. In the illustrated example, the first reference voltage (VRefA) is below the tail reference voltage ($V_{Tail}$), so Quantity A is greater than the target quantity.

After reading the set of memory cells using the first reference voltage (VRefA), the memory system may read (as part of Read B) the set of memory cells using a second reference voltage (VRefB) that is based on a second offset value (which in turn is based on the first offset value and the results of Read A). Put another way, the second reference voltage (VRefB) may be selected based on 1) the first reference voltage (VRefA) and 2) the relationship between Quantity A and the target quantity.

For example, if Quantity A is less than the target quantity (indicating that the first reference voltage was too high), the memory system may select the second reference voltage (VRefB) to be less than the first reference voltage (VRefA) (which the memory system may do by selecting a second offset value that is greater than the first offset value). For instance, in a binary search, the memory system may select the second offset value to be between the offset values for bin 5 and bin 6. If Quantity A is greater than the target quantity (as illustrated in FIG. 3) (which indicates that the first reference voltage was too low), the memory system may select the second reference voltage (VRefB) to be greater than the first reference voltage (VRefA) (which the memory system may do by selecting a second offset value that is less than the first offset value). For instance, in a binary search, the memory system may select the second offset value to be between the offset values for bin 1 and bin 2.

After reading the set of memory cells using the second reference voltage (VRefB), the memory system may determine the quantity of memory cells with Vt levels above the second reference voltage. The quantity of memory cells with Vt levels above the second reference voltage, as determined during Read B, may be denoted Quantity B. The memory system may also compare Quantity B with the target quantity. In the illustrated example, VRefB is above the tail reference voltage ($V_{Tail}$), so Quantity B is less than the target quantity.

After performing two reads on the set of memory cells (e.g., Read A and Read B), the memory system may evaluate the relationship between Quantity A, Quantity B, and the target quantity. If the target quantity is greater than both Quantity A and Quantity B (meaning that both VRrefA and VRefB are greater than the tail reference voltage $V_{Tail}$), the memory system may determine to perform a third read using a third reference voltage that is less than both the first reference voltage (VRefA) and the second reference voltage (VRefB). If the target quantity is less than both Quantity A and Quantity B (meaning that both VRrefA and VRefB are less than the tail reference voltage $V_{Tail}$), the memory system may determine to perform a third read using a third reference voltage that is greater than both the first reference voltage (VRefA) and the second reference voltage (VRefB).

If the target quantity switches from being less than Quantity A to being greater than Quantity B (or vice versa), the memory system may determine that the Vt drift is within the bin(s) that have offset values between the first offset value and the second offset value. If a single bin has an L7 offset value between the first offset value and the second offset value, the memory system may determine that the Vt drift for the set of memory cells falls within that bin and may select the offset value(s) of that bin. For instance, if the first offset value is between L7_3 (the L7 offset value for bin 3) and L7_4 (the offset value for bin 4) and the second offset value is between L7_4 and L7_5 (the offset value for bin 5), the memory system may determine that the (worse-case) Vt drift for the set of memory cells falls within bin 4. Accordingly, the memory system may select the offset values for bin 4 (e.g., L1_4 through L7_4) for use.

On the other hand, if multiple bins have L7 offset values between the first offset value and the second offset value, the memory system may determine to perform another read operation using a third reference voltage so that the memory system can determine the correct bin. For example, the memory system may perform Read C in which the memory system reads the set of memory cells using a third reference voltage (VRefC) that is between the first reference voltage (VRefA) and the second reference voltage (VRefB). The third reference voltage (VRefC) may be based on a third offset value that is between the first offset value and the second offset value. For instance, in the illustrated example, the third offset value may be between the offset value for bin 2 (L7_2) and the offset value for bin 3 (L7_3) due to Quantity B being less than the target quantity (indicating that VRefB was too high and that the third offset voltage should be greater than the second offset voltage so that VRefC is less than VRefB). So, in the illustrated scenario, the third offset value is based on (e.g., between) the first offset value and the second offset value.

If, unlike in the illustrated scenario, Quantity B is greater than the target quantity (indicating that VRefB was too low) the third reference voltage (VRefC) may be selected to be higher than second reference voltage (meaning that the third offset voltage may be less than the second offset voltage).

After reading the set of memory cells using the third reference voltage (VRefC), the memory system may determine the quantity of memory cells with Vt levels above the third reference voltage (VRefC). The quantity of memory cells with Vt levels above the third reference voltage, as determined during Read C, may be denoted Quantity C. The memory system may compare Quantity C with the target quantity. In the illustrated example, VRefC is greater than the tail reference voltage $V_{Tail}$, so Quantity C is less than the target quantity.

The memory system may determine the correct bin (e.g., Vt drift) for the set of memory cells based on the relationship between Quantity C and the target quantity. For example, if Quantity C is greater than the target quantity and the third offset value is between bin 2 and bin 3, the memory system may determine that bin 3 is the correct bin (e.g., Vt drift) for the set of memory cells. If Quantity C is less than the target quantity (as illustrated) and the third offset value is between bin 2 and bin 3, the memory system may determine that bin 2 is the correct bin (e.g., Vt drift) for the set of memory cells.

Upon determining the correct bin for the set of memory cells, the memory system may select the offset value(s) for that bin for subsequent read operations that are not part of the Vt drift detection procedure. So, the L7 offset value selected for the set of memory cells may be based on one or more of the first offset value, the second offset value, and the third offset value.

Thus, in the illustrated example, the Vt drift detection procedure performed by the memory system may include a binary search in which the same set of memory cells is read using three different reference voltages. However, the Vt drift detection procedure may be implemented using different search strategies. For instance, in a linear search, the memory system may read the set of memory cells using an initial reference voltage (e.g., based on an offset value between bin 3 and bin 4) and may use subsequently higher reference voltages (or lower reference voltages) until the correct bin is determined. That is, the memory system may increasingly modify the reference voltage in the same direction until the target quantity is passed. A linear search may use at least two read operations (so that the memory system can detect the switch point).

In an alternative, the memory system may determine the correct bin by determining in the quantity of memory cells with Vt levels above a given reference voltage falls within a threshold range of the target quantity (e.g., rather than looking for the switch point in which the quantity of memory cells with Vt levels above the reference voltage switches from being greater than the target quantity to being less than the target quantity, or vice versa). For example, if the quantity of memory cells with Vt levels above a reference voltage is within a threshold range of the target quantity (where the target quantity may be 50%×3σ), the memory system may determine that the correct bin is the bin associated with the offset value used for the reference voltage. In such an alternative, the offset values used by the memory system may be the offset values associated with the bins (as opposed to offset values that are between the offset values associated with two adjacent bins).

The reference voltages used for the bin detection procedure may be associated with (e.g., based on) the highest Vt distribution supported by the memory system, which may allow the memory system to ensure that the worst-case Vt drift is compensated. In some examples, the set of memory cells may be the memory cells of one or more pages in a virtual block that includes one or more physical blocks on one or more physical planes. In such examples, the bin and offset values determined for the set of memory cells may be applied to (e.g., used for) the virtual block.

Although described with reference to counting and comparing quantities of memory cells with threshold voltages greater than the target voltage, the techniques described herein may be implemented by counting and comparing quantities of memory cells with threshold voltages less than the target voltage, or using a ratios of quantities, among other options.

Figure 4:
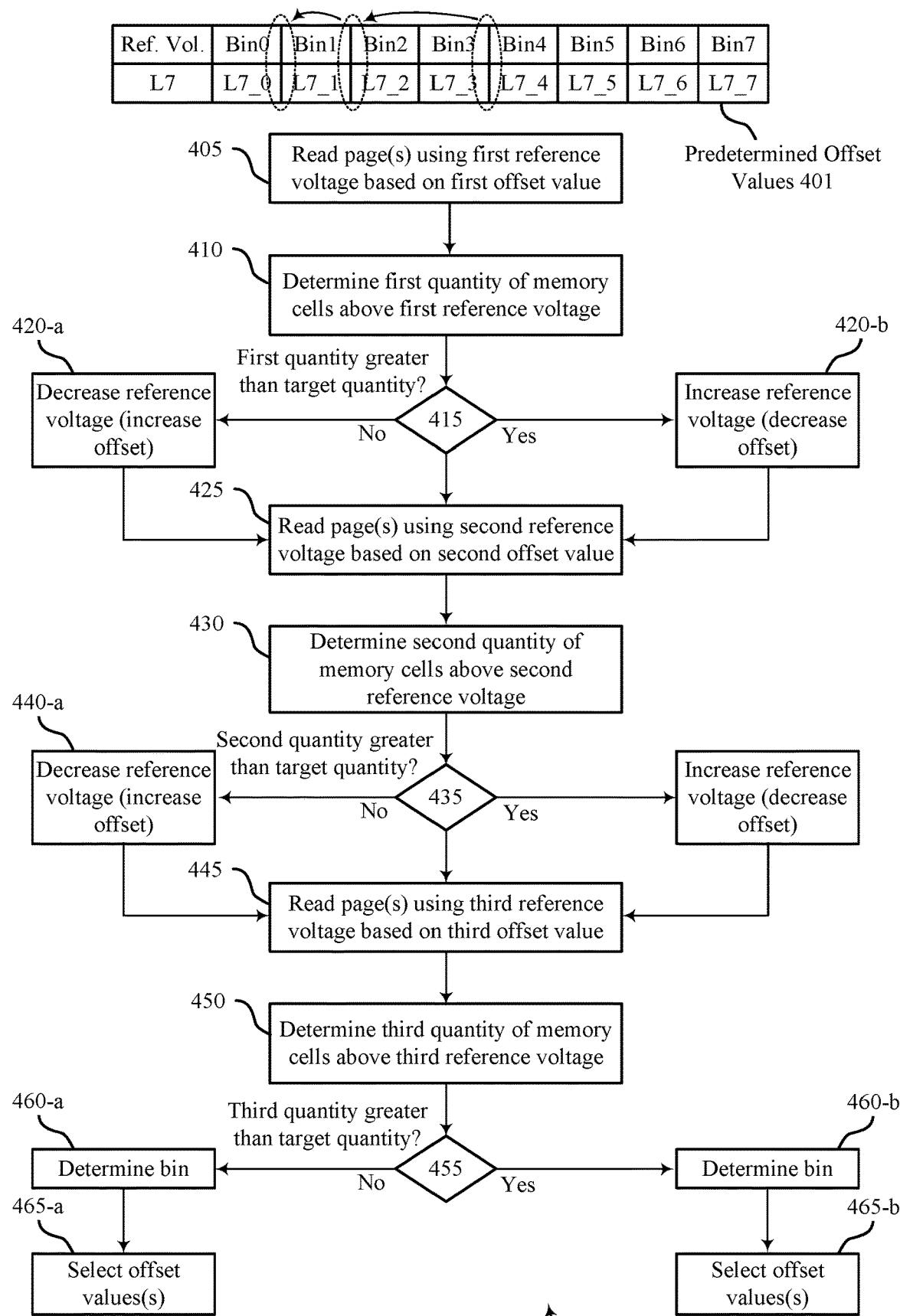
FIG. 4 illustrates an example of a process flow that supports determining reference voltage offsets for read operations in a memory system in accordance with examples as disclosed herein.

FIG. 4 illustrates an example of a process flow 400 that supports determining reference voltage offsets for read operations in a memory system in accordance with examples as disclosed herein. The process flow 400 may be implemented by a memory system such as the memory system 110 or the memory system 210 as described with reference to FIGS. 1 and 2, respectively. The process flow 400 may illustrate operations of the memory system that implements the Vt drift detection techniques described herein. For example, process flow 400 may illustrate a binary search in the context of a set of predetermined offset values 401, which may be the offset values for the reference voltage (e.g., L7) associated with the highest Vt distribution supported by the memory system.

At 405, a set of memory cells may be read using a first reference voltage that is based on a first offset value. The set of memory cells may include the memory cells of one or more pages in one or more planes (e.g., a first page in a first plane and a second page in a second plane). If the set of memory cells includes pages in different memory planes, the read operation may be referred to as a multi-plane read operation. Unlike other Vt drift detection procedures, the Vt drift detection procedure described herein may support multi-plane read operations, which may improve the latency and accuracy of the Vt drift detection procedure relative to other Vt drift detection procedures. Reading memory cells using a reference voltage may include comparing the Vt values of the memory cells to the reference voltage.

In some examples, the first offset value may be based on the offset values for two adjacent intermediate bins. For example, the first offset value may be based on (e.g., between) the offset value for bin 3 (e.g., L7_3) and the offset value for bin 4 (e.g., L7_4) so that the memory system can implement a binary search.

At 410, a first quantity of memory cells with Vt levels greater than the first reference voltage may be determined based on reading the set of memory cells using the first reference voltage. At 415, it may be determined whether the first quantity is greater than a target quantity. In some examples, the target quantity may be equal to an expected quantity (e.g., 50%×3σ) of outlier memory cells.

If, at 415, it is determined that the first quantity is less than the target quantity (indicating that the first reference voltage was too high), the memory system may proceed to 420-a and select a second reference voltage that is less than the first reference voltage. So, in this example, the second reference voltage may be based on a second offset value that is greater than the first offset value. For example, if the first offset value is between the offset values for bin 3 and bin 4, the second offset value may be based on (e.g., between) the offset value for bin 5 (e.g., L7_5) and the offset value for bin 6 (e.g., L7_6).

If, at 415, it is determined that the first quantity is greater than the target quantity (indicating that the first reference voltage was too low), the memory system may proceed to 420-b and select a second reference voltage that is greater than the first reference voltage. So, in this example, the second reference voltage may be based on a second offset value that is less than the first offset value. For example, if the first offset value is between the offset values for bin 3 and bin 4, the second offset value may be based on (e.g., between) the offset value for bin 1 (e.g., L7_1) and the offset value for bin 2 (e.g., L7_2).

At 425, the set of memory cells may be read using the second reference voltage that is based on the second offset value. At 430, a second quantity of memory cells with Vt levels greater than the second reference voltage may be determined based on reading the set of memory cells using the second reference voltage. At 435, it may be determined whether the second quantity is greater than the target quantity.

If, at 435, it is determined that the second quantity is less than the target quantity (indicating that the second reference voltage was too high), the memory system may proceed to 440-*a* and select a third reference voltage that is less than the second reference voltage. So, in this example, the third reference voltage may be based on a third offset value that is greater than the second offset value. For example, if the second offset value is between the offset values for bin 1 and bin 2, the third offset value may be based on (e.g., between) the offset value for bin 2 (e.g., L7_2) and the offset value for bin 3 (e.g., L7_3).

If, at 435, it is determined that the second quantity is greater than the target quantity (indicating that the second reference voltage was too low), the memory system may proceed to 440-*b* and select a third reference voltage that is greater than the second reference voltage. So, in this example, the third reference voltage may be based on a third offset value that is less than the second offset value. For example, if the second offset value is between the offset values for bin 1 and bin 2, the third offset value may be based on (e.g., between) the offset value for bin 0 (e.g., L7_0) and the offset value for bin 1 (e.g., L7_1).

At 445, the set of memory cells may be read using the third reference voltage that is based on the third offset value. At 450, a third quantity of memory cells with Vt levels greater than the third reference voltage may be determined based on reading the set of memory cells. At 455, it may be determined whether the second quantity is greater than the target quantity.

If at 455, it is determined that the third quantity is less than the target quantity (indicating that the third reference voltage was too high), the memory system may proceed to 460-*a* and determine the bin (e.g., Vt drift) for the set of memory cells based on the third offset value and the third quantity being less than the target quantity. For example, if the third offset value is between the offset values for bin 0 and bin 1, the memory system may determine that the correct bin (e.g., Vt drift) for the set of memory cells is bin 1. Accordingly, at 465-*a*, the memory system may select the offset values(s) for the set of memory cells (e.g., for adjusting the reference voltages used to read the set of memory cells) based on the bin determined at 460-*a*. For example, the memory system may select for use the offset values associated with bin 1.

If at 455, it is determined that the third quantity is greater than the target quantity (indicating that the third reference voltage was too low), the memory system may proceed to 460-*b* and determine the bin (e.g., Vt drift) for the set of memory cells based on the third offset value and the third quantity being greater than the target quantity. For example, if the third offset value is between the offset values for bin 0 and bin 1, the memory system may determine that the correct bin (e.g., Vt drift) for the set of memory cells is bin 0. Accordingly, at 465-*b*, the memory system may select the offset values(s) for the set of memory cells (e.g., for adjusting the reference voltages used to read the set of memory cells) based on the bin determined at 460-*b*. For example, the memory system may select for use the offset values associated with bin 0.

Thus, a memory system may implement a Vt drift detection procedure to determine offset values for a set of memory cells. Alternative examples of the foregoing may be implemented, where some operations are performed in a different order than described, are performed in parallel, or are not performed at all. In some cases, operations may include additional features not mentioned herein, or further operations may be added. Additionally, some operations may be performed multiple times or some combinations of operations may repeat or cycle.

Aspects of the process flow 400 may be implemented by one or more controllers, among other components. Additionally or alternatively, aspects of the process flow 400 may be implemented as instructions stored in memory (e.g., firmware stored in a memory coupled with a memory system). For example, the instructions, if executed by one or more controllers (e.g., the memory system controller 115, a local controller 135, the memory system controller 215), may cause the one or more controllers to perform the operations of the process flow 400.

Figure 5:
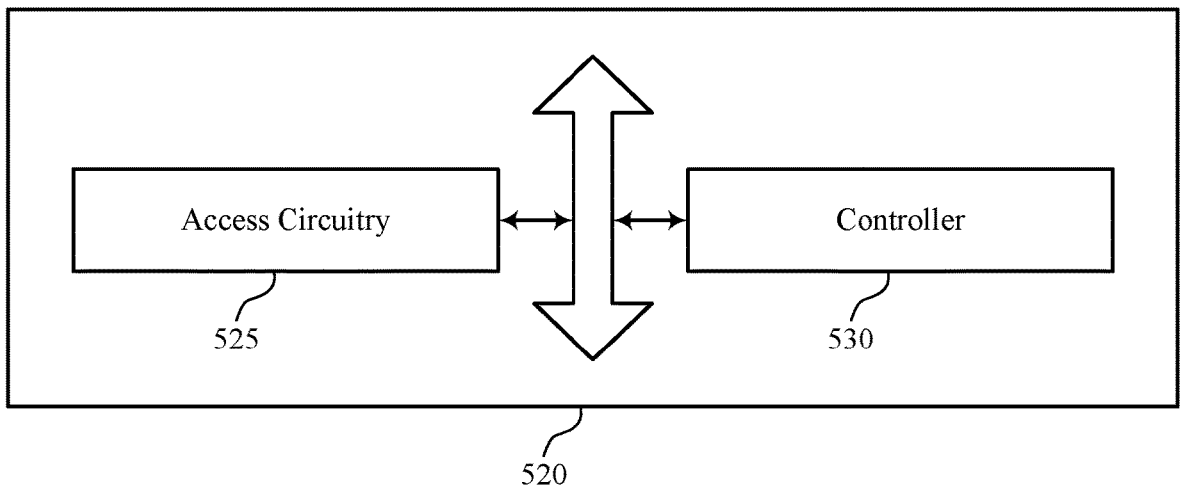
FIG. 5 illustrates a block diagram of a memory system that supports determining reference voltage offsets for read operations in accordance with examples as disclosed herein.

FIG. 5 illustrates a block diagram 500 of a memory system 520 that supports determining reference voltage offsets for read operations in a memory system in accordance with examples as disclosed herein. The memory system 520 may be an example of aspects of a memory system as described with reference to FIGS. 1 through 4. The memory system 520, or various components thereof, may be an example of means for performing various aspects of determining reference voltage offsets for read operations in a memory system as described herein. For example, the memory system 520 may include an access circuitry 525, one or more controllers 530, or any combination thereof. Each of these components may communicate, directly or indirectly, with one another (e.g., via one or more buses).

The access circuitry 525 may be configured as or otherwise support a means for reading a page of memory cells using a first reference voltage that is based at least in part on a first offset value and using a second reference voltage that is based at least in part on a second offset value. The one or more controllers 530 may be configured as or otherwise support a means for determining, based at least in part on reading the page using the first reference voltage, a first quantity of memory cells with threshold voltages above the first reference voltage. In some examples, the one or more controllers 530 may be configured as or otherwise support a means for determining, based at least in part on reading the page using the second reference voltage, a second quantity of memory cells with threshold voltages above the second reference voltage. In some examples, the one or more controllers 530 may be configured as or otherwise support a means for selecting, based at least in part on the first quantity being less than a target quantity and the second quantity being greater than the target quantity, an offset value for a set of pages that that is between the first offset value and the second offset value.

In some examples, the first reference voltage and the second reference voltage are each associated with an upper threshold voltage distribution of multiple threshold voltage distributions supported by the memory cells of the page.

In some examples, the one or more controllers 530 may be configured as or otherwise support a means for selecting the second offset value for the second reference voltage to be greater than the first offset value based at least in part on the first quantity being less than the target quantity.

In some examples, the one or more controllers 530 may be configured as or otherwise support a means for selecting the first offset value for reading the page based at least in part on the first offset value being between two intermediate values in a predetermined set of offset values.

In some examples, the page is in a first plane and the set of pages includes a second page of memory cells in a second plane, and the access circuitry 525 may be configured as or otherwise support a means for reading, concurrently with reading the page using the first reference voltage, the second page in the second plane using the first reference voltage, where the offset value is selected for the set of pages based at least in part on reading the second page using the first reference voltage.

In some examples, the access circuitry 525 may be configured as or otherwise support a means for reading, concurrently with reading the page using the second reference voltage, the second page in the second plane using the second reference voltage, where the offset value is selected for the set of pages based at least in part on reading the second page using the second reference voltage.

In some examples, the access circuitry 525 may be configured as or otherwise support a means for reading, before reading the page using the first reference voltage, the page using a third reference voltage that is based at least in part on a third offset value. In some examples, the one or more controllers 530 may be configured as or otherwise support a means for determining, based at least in part on reading the page using the third reference voltage, that a third quantity of memory cells with threshold voltages above the third reference voltage is less than the target quantity, where the page of memory cells is read using the first reference voltage based at least in part on the third quantity being less than the target quantity.

In some examples, the one or more controllers 530 may be configured as or otherwise support a means for selecting the first offset value for the first reference voltage to be greater than the third offset value based at least in part on the third quantity being less than the target quantity.

In some examples, the one or more controllers 530 may be configured as or otherwise support a means for reading, after reading the page using the second reference voltage, the page using a third reference voltage that is based at least in part on a third offset value. In some examples, the one or more controllers 530 may be configured as or otherwise support a means for determining, based at least in part on reading the page using the third reference voltage, that a third quantity of memory cells with threshold voltages above the third reference voltage is less than the target quantity, where offset value is selected based at least in part on the third offset value and the third quantity being greater than the target quantity.

In some examples, the one or more controllers 530 may be configured as or otherwise support a means for selecting the third offset value for the third reference voltage to be less than the second offset value based at least in part on the second quantity being greater than the target quantity.

In some examples, reading the page using the first reference voltage and the second reference voltage is part of a threshold voltage drift detection procedure for a memory system. In such examples, the one or more controllers 530 may be configured as or otherwise support a means for performing the threshold voltage drift detection procedure during an initialization stage of the memory system.

In some examples, reading the page using the first reference voltage includes comparing threshold voltages of the memory cells with the first reference voltage. In some examples, reading the page using the second reference voltage includes comparing threshold voltages of the memory cells with the second reference voltage.

Figure 6:
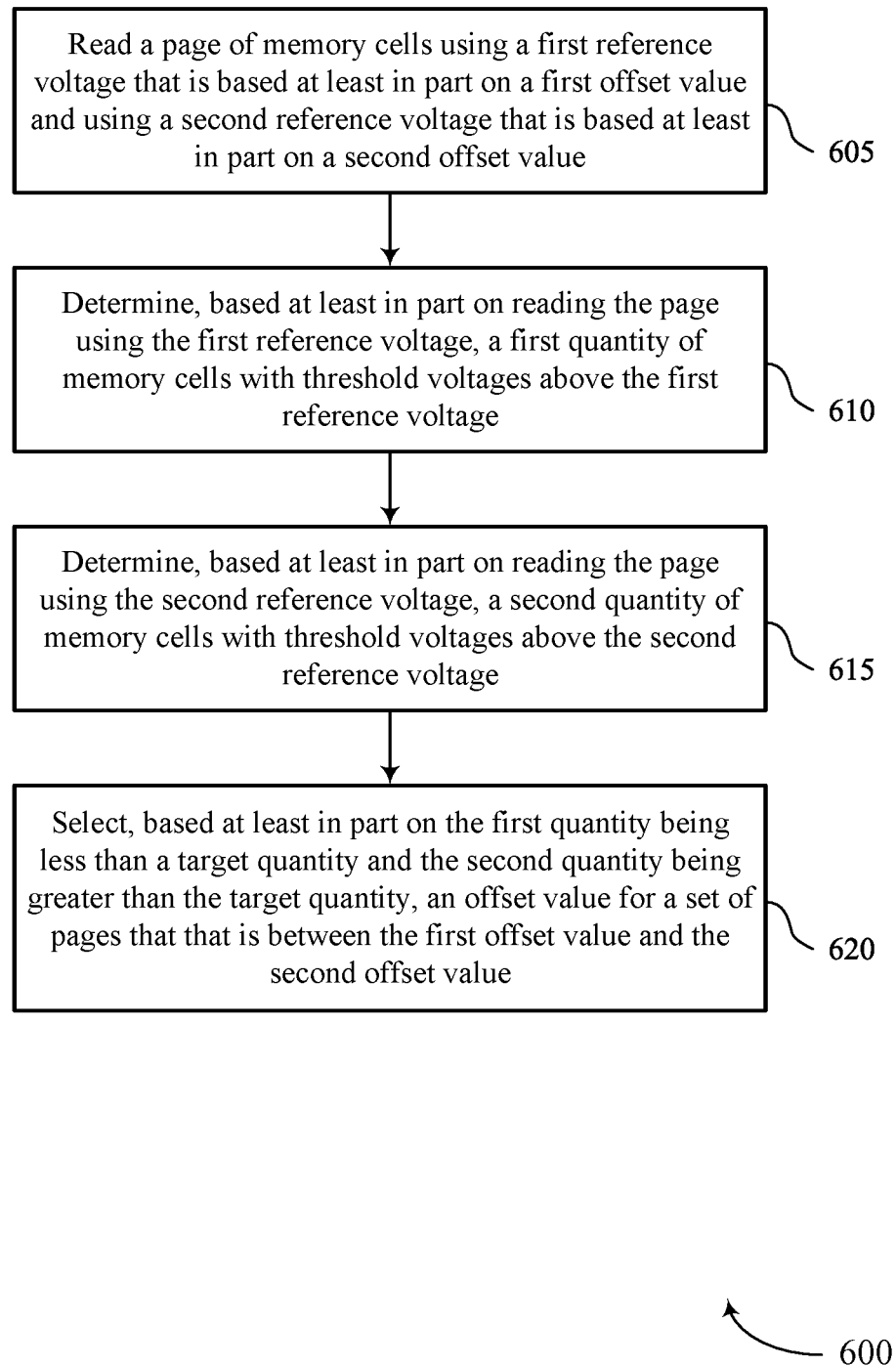
FIG. 6 illustrates a flowchart showing a method or methods that support determining reference voltage offsets for read operations in accordance with examples as disclosed herein.

FIG. 6 illustrates a flowchart showing a method 600 that supports determining reference voltage offsets for read operations in a memory system in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include reading a page of memory cells using a first reference voltage that is based at least in part on a first offset value and using a second reference voltage that is based at least in part on a second offset value. The operations of 605 may be performed in accordance with examples as disclosed herein. In some examples, aspects of the operations of 605 may be performed by an access circuitry 525 as described with reference to FIG. 5.

At 610, the method may include determining, based at least in part on reading the page using the first reference voltage, a first quantity of memory cells with threshold voltages above the first reference voltage. The operations of 610 may be performed in accordance with examples as disclosed herein. In some examples, aspects of the operations of 610 may be performed by one or more controllers 530 as described with reference to FIG. 5.

At 615, the method may include determining, based at least in part on reading the page using the second reference voltage, a second quantity of memory cells with threshold voltages above the second reference voltage. The operations of 615 may be performed in accordance with examples as disclosed herein. In some examples, aspects of the operations of 615 may be performed by one or more controllers 530 as described with reference to FIG. 5.

At 620, the method may include selecting, based at least in part on the first quantity being less than a target quantity and the second quantity being greater than the target quantity, an offset value for a set of pages that that is between the first offset value and the second offset value. The operations of 620 may be performed in accordance with examples as disclosed herein. In some examples, aspects of the operations of 620 may be performed by one or more controllers 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, system, or non-transitory computer-readable medium including operations, features, circuitry, logic, means, or instructions, or any combination thereof for reading a page of memory cells using a first reference voltage that is based at least in part on a first offset value and using a second reference voltage that is based at least in part on a second offset value; determining, based at least in part on reading the page using the first reference voltage, a first quantity of memory cells with threshold voltages above the first reference voltage; determining, based at least in part on reading the page using the second reference voltage, a second quantity of memory cells with threshold voltages above the second reference voltage; and selecting, based at least in part on the first quantity being less than a target quantity and the second quantity being greater than the target quantity, an offset value for a set of pages that that is between the first offset value and the second offset value.

Aspect 2: The method, apparatus, system, or non-transitory computer-readable medium of aspect 1, where the first reference voltage and the second reference voltage are each associated with an upper threshold voltage distribution of multiple threshold voltage distributions supported by the memory cells of the page.

Aspect 3: The method, apparatus, system, or non-transitory computer-readable medium of any of aspects 1 through 2, further including operations, features, circuitry, logic, means, or instructions, or any combination thereof for selecting the second offset value for the second reference voltage to be greater than the first offset value based at least in part on the first quantity being less than the target quantity.

Aspect 4: The method, apparatus, system, or non-transitory computer-readable medium of any of aspects 1 through 3, further including operations, features, circuitry, logic, means, or instructions, or any combination thereof for selecting the first offset value for reading the page based at least in part on the first offset value being between two intermediate values in a predetermined set of offset values.

Aspect 5: The method, apparatus, system, or non-transitory computer-readable medium of any of aspects 1 through 4, where the page is in a first plane and the set of pages includes a second page of memory cells in a second plane and the method, apparatuses, and non-transitory computer-readable medium further includes operations, features, circuitry, logic, means, or instructions, or any combination thereof for reading, concurrently with reading the page using the first reference voltage, the second page in the second plane using the first reference voltage, where the offset value is selected for the set of pages based at least in part on reading the second page using the first reference voltage.

Aspect 6: The method, apparatus, system, or non-transitory computer-readable medium of aspect 5, further including operations, features, circuitry, logic, means, or instructions, or any combination thereof for reading, concurrently with reading the page using the second reference voltage, the second page in the second plane using the second reference voltage, where the offset value is selected for the set of pages based at least in part on reading the second page using the second reference voltage.

Aspect 7: The method, apparatus, system, or non-transitory computer-readable medium of any of aspects 1 through 6, further including operations, features, circuitry, logic, means, or instructions, or any combination thereof for reading, before reading the page using the first reference voltage, the page using a third reference voltage that is based at least in part on a third offset value and determining, based at least in part on reading the page using the third reference voltage, that a third quantity of memory cells with threshold voltages above the third reference voltage is less than the target quantity, where the page of memory cells is read using the first reference voltage based at least in part on the third quantity being less than the target quantity.

Aspect 8: The method, apparatus, system, or non-transitory computer-readable medium of aspect 7, further including operations, features, circuitry, logic, means, or instructions, or any combination thereof for selecting the first offset value for the first reference voltage to be greater than the third offset value based at least in part on the third quantity being less than the target quantity.

Aspect 9: The method, apparatus, system, or non-transitory computer-readable medium of any of aspects 1 through 8, further including operations, features, circuitry, logic, means, or instructions, or any combination thereof for reading, after reading the page using the second reference voltage, the page using a third reference voltage that is based at least in part on a third offset value and determining, based at least in part on reading the page using the third reference voltage, that a third quantity of memory cells with threshold voltages above the third reference voltage is less than the target quantity, where offset value is selected based at least in part on the third offset value and the third quantity being greater than the target quantity.

Aspect 10: The method, apparatus, system, or non-transitory computer-readable medium of aspect 9, further including operations, features, circuitry, logic, means, or instructions, or any combination thereof for selecting the third offset value for the third reference voltage to be less than the second offset value based at least in part on the second quantity being greater than the target quantity.

Aspect 11: The method, apparatus, system, or non-transitory computer-readable medium of any of aspects 1 through 10, where reading the page using the first reference voltage and the second reference voltage is part of a threshold voltage drift detection procedure for a memory system, the method, apparatuses, and non-transitory computer-readable medium further includes operations, features, circuitry, logic, means, or instructions, or any combination thereof for performing the threshold voltage drift detection procedure during an initialization stage of the memory system.

Aspect 12: The method, apparatus, system, or non-transitory computer-readable medium of any of aspects 1 through 11, where reading the page using the first reference voltage includes comparing threshold voltages of the memory cells with the first reference voltage, and where reading the page using the second reference voltage includes comparing threshold voltages of the memory cells with the second reference voltage.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system, comprising:
   one or more memory devices; and
   one or more controllers coupled with the one or more memory devices and configured to cause the system to:
      read a page of memory cells using a first reference voltage that is based at least in part on a first offset value and using a second reference voltage that is based at least in part on a second offset value;
      determine, based at least in part on reading the page using the first reference voltage, a first quantity of memory cells with threshold voltages above the first reference voltage;
      determine, based at least in part on reading the page using the second reference voltage, a second quantity of memory cells with threshold voltages above the second reference voltage; and
      select, based at least in part on the first quantity being less than a target quantity and the second quantity being greater than the target quantity, an offset value for a set of pages that that is between the first offset value and the second offset value.

2. The system of claim 1, wherein the first reference voltage and the second reference voltage are each associated with an upper threshold voltage distribution of multiple threshold voltage distributions supported by the memory cells of the page.

3. The system of claim 1, wherein the one or more controllers are further configured to cause the system to:
   select the second offset value for the second reference voltage to be greater than the first offset value based at least in part on the first quantity being less than the target quantity.

4. The system of claim 1, wherein the one or more controllers are further configured to cause the system to:
   select the first offset value for reading the page based at least in part on the first offset value being between two intermediate values in a predetermined set of offset values.

5. The system of claim 1, wherein the page is in a first plane and the set of pages includes a second page of memory cells in a second plane, and the one or more controllers are further configured to cause the system to:
   read, concurrently with reading the page using the first reference voltage, the second page in the second plane using the first reference voltage, wherein the offset value is selected for the set of pages based at least in part on reading the second page using the first reference voltage.

6. The system of claim 5, wherein the one or more controllers are further configured to cause the system to:
read, concurrently with reading the page using the second reference voltage, the second page in the second plane using the second reference voltage, wherein the offset value is selected for the set of pages based at least in part on reading the second page using the second reference voltage.

7. The system of claim 1, wherein the one or more controllers are further configured to cause the system to:
read, before reading the page using the first reference voltage, the page using a third reference voltage that is based at least in part on a third offset value; and
determine, based at least in part on reading the page using the third reference voltage, that a third quantity of memory cells with threshold voltages above the third reference voltage is less than the target quantity, wherein the page of memory cells is read using the first reference voltage based at least in part on the third quantity being less than the target quantity.

8. The system of claim 7, wherein the one or more controllers are further configured to cause the system to:
select the first offset value for the first reference voltage to be greater than the third offset value based at least in part on the third quantity being less than the target quantity.

9. The system of claim 1, wherein the one or more controllers are further configured to cause the system to:
read, after reading the page using the second reference voltage, the page using a third reference voltage that is based at least in part on a third offset value; and
determine, based at least in part on reading the page using the third reference voltage, that a third quantity of memory cells with threshold voltages above the third reference voltage is less than the target quantity, wherein the offset value is selected based at least in part on the third offset value and the third quantity being greater than the target quantity.

10. The system of claim 9, wherein the one or more controllers are further configured to cause the system to:
select the third offset value for the third reference voltage to be less than the second offset value based at least in part on the second quantity being greater than the target quantity.

11. The system of claim 1, wherein reading the page using the first reference voltage and the second reference voltage is part of a threshold voltage drift detection procedure for a memory system, and the one or more controllers are further configured to cause the system to:
perform the threshold voltage drift detection procedure during an initialization stage of the memory system.

12. The system of claim 1, wherein:
reading the page using the first reference voltage comprises comparing threshold voltages of the memory cells with the first reference voltage, and wherein:
reading the page using the second reference voltage comprises comparing threshold voltages of the memory cells with the second reference voltage.

13. A method, comprising:
reading a page of memory cells using a first reference voltage that is based at least in part on a first offset value and using a second reference voltage that is based at least in part on a second offset value;
determining, based at least in part on reading the page using the first reference voltage, a first quantity of memory cells with threshold voltages above the first reference voltage;
determining, based at least in part on reading the page using the second reference voltage, a second quantity of memory cells with threshold voltages above the second reference voltage; and
selecting, based at least in part on the first quantity being less than a target quantity and the second quantity being greater than the target quantity, an offset value for a set of pages that that is between the first offset value and the second offset value.

14. The method of claim 13, wherein the first reference voltage and the second reference voltage are each associated with an upper threshold voltage distribution of multiple threshold voltage distributions supported by the memory cells of the page.

15. The method of claim 13, further comprising:
selecting the second offset value for the second reference voltage to be greater than the first offset value based at least in part on the first quantity being less than the target quantity.

16. The method of claim 13, further comprising:
selecting the first offset value for reading the page based at least in part on the first offset value being between two intermediate values in a predetermined set of offset values.

17. The method of claim 13, wherein the page is in a first plane and the set of pages includes a second page of memory cells in a second plane, the method further comprising:
reading, concurrently with reading the page using the first reference voltage, the second page in the second plane using the first reference voltage, wherein the offset value is selected for the set of pages based at least in part on reading the second page using the first reference voltage.

18. The method of claim 17, further comprising:
reading, concurrently with reading the page using the second reference voltage, the second page in the second plane using the second reference voltage, wherein the offset value is selected for the set of pages based at least in part on reading the second page using the second reference voltage.

19. The method of claim 13, further comprising:
reading, before reading the page using the first reference voltage, the page using a third reference voltage that is based at least in part on a third offset value; and
determining, based at least in part on reading the page using the third reference voltage, that a third quantity of memory cells with threshold voltages above the third reference voltage is less than the target quantity, wherein the page of memory cells is read using the first reference voltage based at least in part on the third quantity being less than the target quantity.

20. A non-transitory computer-readable medium storing code, the code comprising instructions executable by a processor to:
read a page of memory cells using a first reference voltage that is based at least in part on a first offset value and using a second reference voltage that is based at least in part on a second offset value;
determine, based at least in part on reading the page using the first reference voltage, a first quantity of memory cells with threshold voltages above the first reference voltage;
determine, based at least in part on reading the page using the second reference voltage, a second quantity of memory cells with threshold voltages above the second reference voltage; and select, based at least in part on the first quantity being less than a target quantity and the second quantity being greater than the target quantity, an offset value for a set of pages that that is between the first offset value and the second offset value.

\* \* \* \* \*